US00RE43026E

(19) United States
(12) Reissued Patent
Moore

(10) Patent Number: US RE43,026 E
(45) Date of Reissued Patent: Dec. 13, 2011

(54) PACKAGE AMUSEMENT DEVICE AND METHOD

(76) Inventor: Steven Jerome Moore, Newtown, CT (US)

(21) Appl. No.: 09/638,012

(22) Filed: Aug. 14, 2000

Related U.S. Patent Documents

Reissue of:
(64) Patent No.: 5,795,209
Issued: Aug. 18, 1998
Appl. No.: 08/581,890
Filed: Jan. 2, 1996

(51) Int. Cl.
*A63H 3/00* (2006.01)

(52) U.S. Cl. ..... 446/73; 446/81; 446/175; 446/491

(58) Field of Classification Search ..... 446/14, 446/72–74, 81, 175, 484, 485, 491, 220, 446/397, 308–311; 40/455, 456; 206/216; 472/56, 64; 434/393
See application file for complete search history.

(56) References Cited

U.S. PATENT DOCUMENTS 3,119,201 A * 1/1964 Brown et al. ..... 446/175
4,221,927 A * 9/1980 Dankman et al. ..... 367/198
4,641,840 A * 2/1987 Larson ..... 463/22
4,836,075 A * 6/1989 Armstrong ..... 84/606
4,904,988 A * 2/1990 Nesbit et al. ..... 340/628
4,925,025 A * 5/1990 Anten et al. ..... 206/335
4,946,745 A * 8/1990 Kempa ..... 428/542.2
4,964,831 A * 10/1990 Wolff ..... 446/75
5,049,107 A * 9/1991 De Nittis ..... 446/397
5,055,084 A * 10/1991 Jokic ..... 446/486
5,083,961 A * 1/1992 Ishiwa ..... 446/75
5,123,192 A * 6/1992 Hsieh ..... 40/442
5,182,872 A * 2/1993 Lee et al. ..... 40/717
5,184,971 A * 2/1993 Williams ..... 446/142
5,209,345 A * 5/1993 Haugabook ..... 220/832
5,209,665 A * 5/1993 Billings et al. ..... 434/169
5,304,096 A * 4/1994 Wilk ..... 472/137
5,359,374 A * 10/1994 Schwartz ..... 40/455
5,385,344 A * 1/1995 Miller et al. ..... 273/460
5,451,180 A * 9/1995 Chan et al. ..... 446/357
5,487,706 A * 1/1996 Wilk ..... 472/54
5,565,845 A * 10/1996 Hara ..... 340/568.6

FOREIGN PATENT DOCUMENTS

GB 1540822 2/1979 ..... 40/457

* cited by examiner

*Primary Examiner* — Bena Miller

(57) ABSTRACT

A package amusement device for producing sound or light upon interaction with a package, comprising: packaging material, a detection apparatus coupled with the packaging material for detecting interaction with the packaging material, a microprocessor apparatus coupled to the packaging material and electronically connected to the detection apparatus for generating a pre-programmed signal with respect to the type of interaction, an amplifying apparatus electronically connected to the microprocessor for amplifying the signal from the microprocessor, and a sense-detectible signal generating apparatus electronically connected to said amplifying apparatus.

22 Claims, 5 Drawing Sheets

PACKAGE AMUSEMENT DEVICE AND METHOD

Matter enclosed in heavy brackets [ ] appears in the original patent but forms no part of this reissue specification; matter printed in italics indicates the additions made by reissue.

BACKGROUND OF INVENTION

1. Field of Invention

This invention relates to an amusement device and method, and more particularly to a package device and method for coupling touch and/or motion to sound and/or light.

2. Description of the Prior Art

The prior art is well aware of toys wherein sound or light is produced by manipulation of a part of the toy or by pressing an engagement means electronically coupled thereto. For example, U.S. Pat. No. 5,353,378 describes sound-emitting face apparel with multiple selection buttons for the retrieval of various sound signals, and describes an embodiment wherein such signals are rendered in tandem with activation of blinking lights positioned on the apparel. Further, numerous toy trucks have been developed over the centuries which produce audible sound and light upon pressing a part of the toy truck or a control device electronically connected to, or directed at, the same. Likewise, greeting cards which produce sound when opened by the consumer have been known for decades.

For centuries toys and other gifts, have been wrapped in packages for heightening the wonder associated with gift giving. Packages used to surround the gift usually consist of a cardboard box or a paper bag. However, plastic housings, such those approximating the shape of an egg, have also been used to package gifts. Packages used to cover gifts are very often themselves covered with colorful and attractive paper to further heighten the anticipation with respect to the gift inside.

Packaging material has conventionally not been an article of entertainment in itself. The entertainment value from such materials has for the most part eminated from the colorful patterns placed on them. Occassionally entertainment is associated with displacing a portion of a package connected to a accuating device, as for example in the well-known "Jack-in-the-Box."

U.S. Pat. No. 5,134,796 describes a simulated container which has entertainment value apart from the patterns placed on the container, and apart from any need to displace any portion of the container to activate an actuating device. The simulated container includes a peripheral wall formed of flexible material and houses a device which when actuated causes the container to carry out a bending motion. The container is "simulated" in that it is not actually designed to house an object or gift.

Heretofore, it has not been known in the art to heighten the anticipation of opening a gift by using light or sound generating sources electronically associated with the packaging material used to package the gift without need to displace a portion of the package itself. Rather such sources have been limited to use to incorporation in the gift itself or the card accompanying the gift.

SUMMARY OF THE INVENTION

The invention claimed provides for electronically coupling tactile, light and/or motion detectors placed in or on the packaging material of a gift to a sound and/or light generating source.

The invention involves a plurality of detectors disposed in or on the packaging material covering a gift or toy. Such detectors are connected to a plurality of microchips also placed in or on the packaging material. The plurality of microchips are pre-programmed to generate a series of signals which simulate a sense-detectible signal generating means, to produce, for example, a sound or linguistic string when activated. The plurality of microchips are connected to a plurality of sound amplifying devices in order for the sense-detectible signal to be more fully appreciated by the person interacting with the package.

In one embodiment of the invention the detectors are pressure-sensitive transducers.

In another embodiment of the invention the detectors are heat-sensitive detectors.

In another embodiment of the invention the detectors are motion-sensitive detectors.

In another embodiment of the invention the detectors are light-sensitive detectors.

In another embodiment of the invention the detectors are touch-sensitive detectors.

In one embodiment, detectors are placed near the side surface of a package such that a person picking up the package would engage the detectors. The detectors are connected to a microchip in communication with a sound amplifying device, such sound amplifying device generally being placed near the upper surface of the package. The microchip is pre-programmed to generate a simulated linguistic string such as "Hey get your hands off!" or "Happy Birthday!," or may be pre-programmed to generate more than one simulated linguistic string depending on which of a plurality of detectors is engaged.

In another embodiment, the sound amplifying device is located antipodal to, or away from, the detector such that any sound generated appears to be coming from within the packaging material.

In yet another embodiment, a gift such as a toy baby dinosaur, chick, or easter bunny is packaged in a real or simulated egg shell. Tactile and/or heat detectors are placed within the egg shell such that when the egg shell is touched and/or heated a select linguistic string is produced. The sound of such linguistic string could be directed such that it appeared to be coming from within the egg. Examples of such linguistic strings include "Let Me Out", "If you free me. I won't hurt you!." Light detectors can also be used such that when one turns out the light or applies a blanket to the egg, a light source within the egg turns on. A linguistic string such as "Hey who turned out the lights" can accompany the turning off of the light source. The toy could be connected by a spring to one end of the egg such that when the egg is opened it would spring out at the person opening the egg. The egg packaging might be opened manually, by electronic means connected to the output of the detector (such that detector output activates the toy such that it undergoes a motional manipulation to break out of the egg), by a gas generating heat-sensitive means positioned such that the gas is released into the inside of the egg, or by utilizing heat labile material in the construction of the egg (such as gluten) such that application of heat causes the egg to "fall-apart."

A further aspect of the present invention is directed to a package amusement device for producing sound or light upon interaction with a package, comprising: packaging material; a detection means coupled with the packaging material for detecting interaction with the packaging material; a microprocessor means coupled with the packaging material and electronically connected to the detection means for generating a pre-programmed signal with respect to the type of interaction; an amplifying means, electronically connected to the microprocessor, for amplifying the signal from the microprocessor means; and a sense-detectable signal generating means electronically connected to the amplifying means And yet a further aspect of the present invention is directed to a method of manufacturing a package material amusement device comprising: placing a plurality of detection means within packaging material; coupling said plurality of detection means to a plurality of microprocessors; coupling the microprocessors to a sense-detectible signal generating means.

And yet a further aspect of the present invention is directed to an egg-shell shaped package amusement device containing a toy gift, comprising: an egg-shell shaped housing; a gift within the egg-shell shaped housing; a detection means for detecting interaction with the egg-shell shaped housing; a microprocessor means coupled with the packaging material and electronically connected to the detection means; an amplifying means, electronically connected to the microprocessor, for amplifying a signal from the microprocessor; a sense-detectible signal generating means electronically connected to the amplifying means.

The packaging material of the claimed invention may encompass a box, a plastic shell, or paper, such as wrapping paper, and may also encompass the ribbon placed on or around other packaging materials.

There are many possible modifications and changes which could be made to the system without straying from the applicant's present invention. Such modifications would be obvious to those skilled in the art and should not limit the scope of applicant's claimed invention.

BRIEF DESCRIPTION OF THE DRAWINGS

For a further understanding of the objects and advantages of the present invention, reference should be had to the following Detailed Description Of the Illustrative Embodiments, taken in conjunction with the accompanying drawings, in which.

DETAILED DESCRIPTION OF THE ILLUSTRATIVE EMBODIMENT OF THE PRESENT INVENTION

Figure 1:
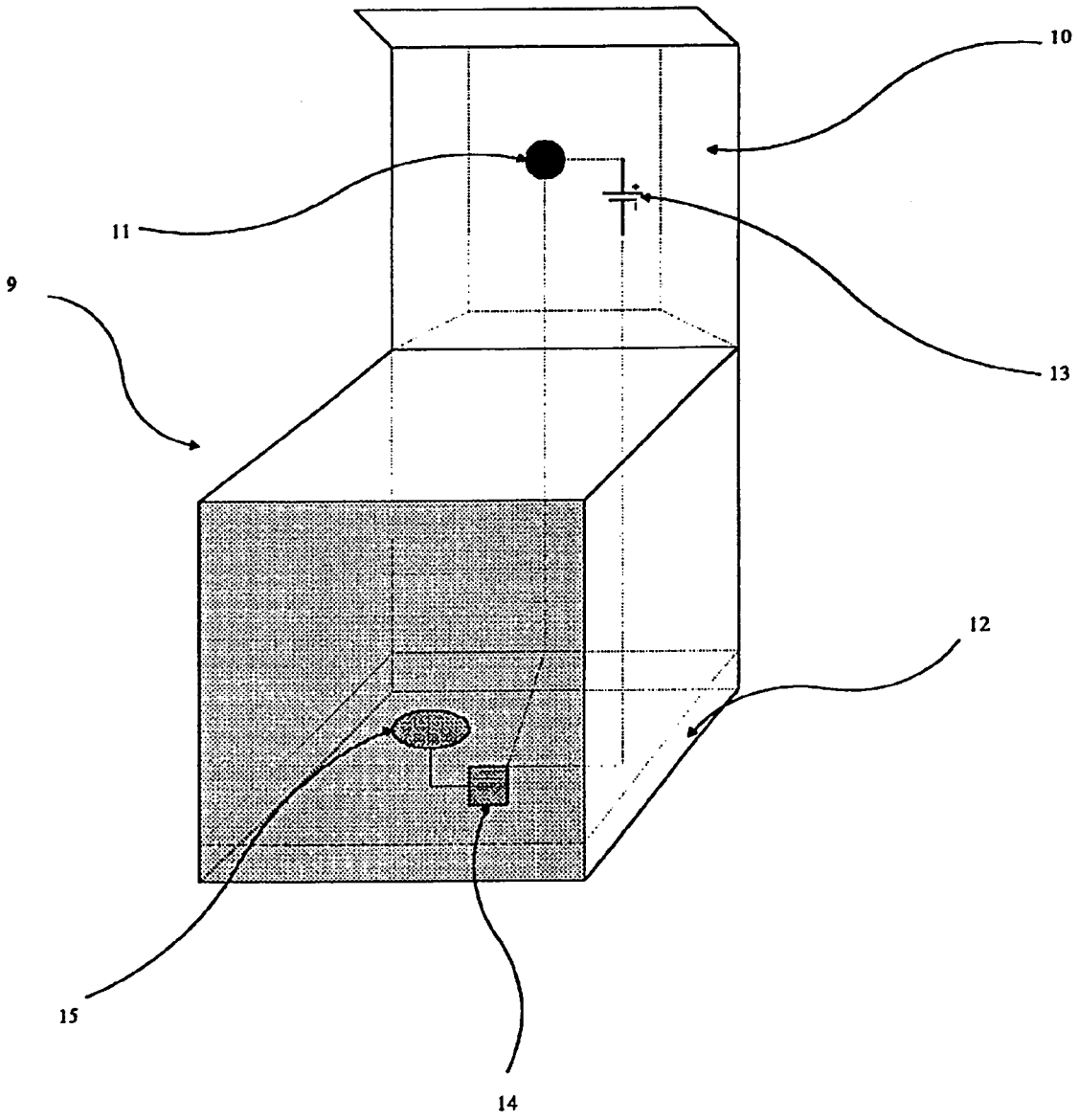
FIG. 1 is a perspective view of a box package comprising an embodiment of the invention.

Referring to FIG. 1 of the drawings, there is shown a box 9 containing transducer 11, microprocessor speech chip 14, speaker means 15, and power source 13. Microprocessor speech chip 14 and speaker means 15 are housed within inferior side 12 of box 9. Transducer 11 is housed antipodal to microprocessor chip 14 and speaker means 9 in superior side 10 of box 9, such that activation of transducer 11 causes the production of sound from a position antipodal to, or away from, its own position.

Figure 2:
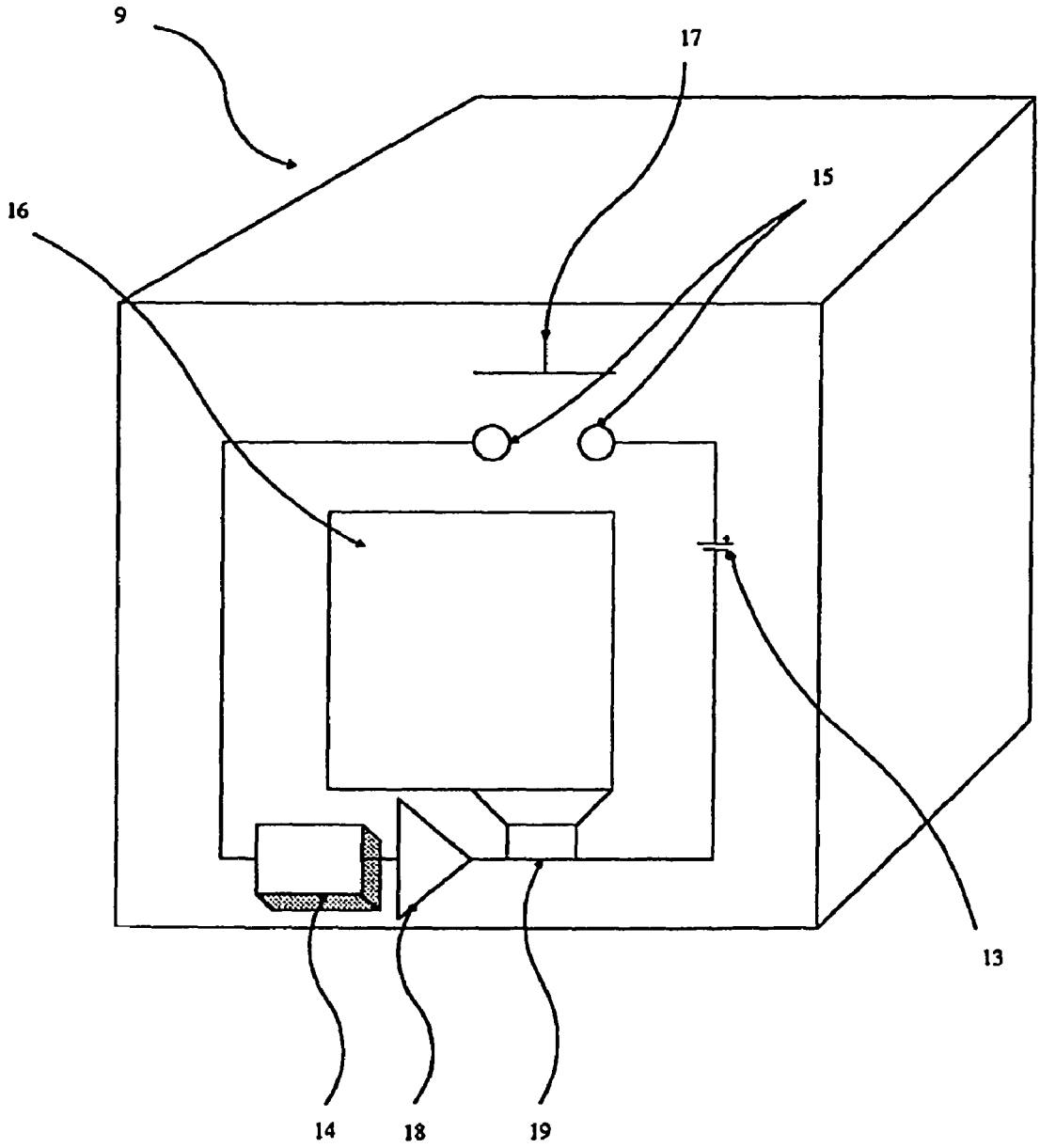
FIG. 2 is a cross-sectional view of a box package side panel incorporating an embodiment of the present invention.

Referring now to FIG. 2, there is shown a cross-sectional view of a box housing an embodiment of the claimed invention. The thickness of the sidewalls of box 9 and the volume of contained space 16 is exaggerated in order to more clearly show the circuitry of the embodiment. Pressure-sensitive transducer 17 activates the circuit by completing the circuit between contact means 15 thereby moving current from power source 13 to speech microprocessor 14. Activation of speech microprocessor 14 eventuates in an analog signal being sent to amplifier 18, which amplifies the same, and sends it to speaker 19.

Figure 3:
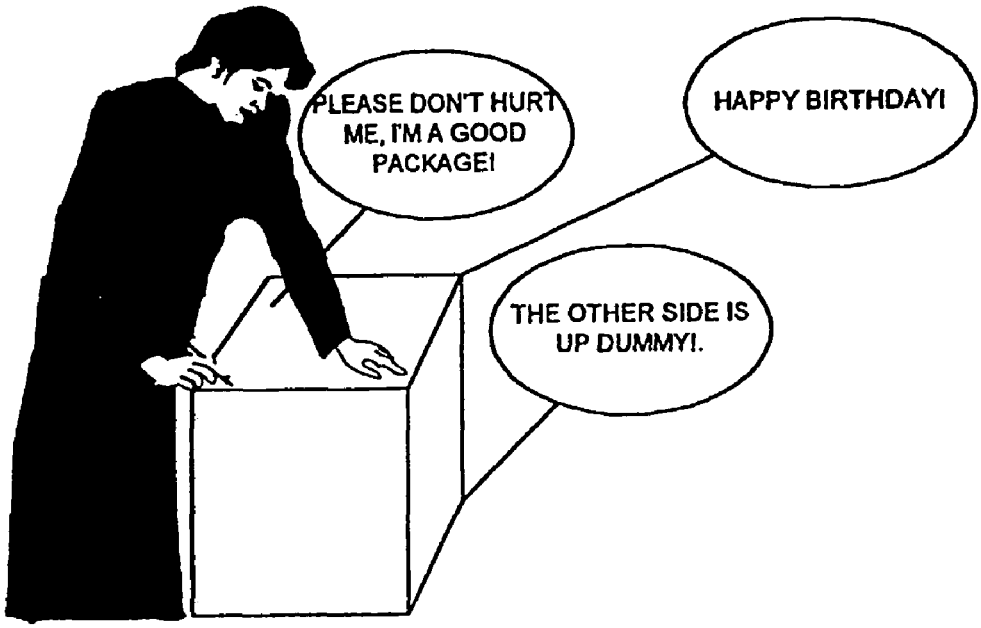
FIG. 3 is a schematic representation of the amusement value of a box-type package incorporating an embodiment of the present invention.

As illustrated in FIG. 3, activation of the circuit results in a linguistic string stored in speech microprocessor 14 being vocalized through speaker 19. The linguistic string is designed to heighten the anticipation and enjoyment involved in opening a package. The particular sound produced may vary depending upon which side of the package is touched, as for example set forth in the schematic "This way is up dummy!" when touching the top of the box.

Figure 4:
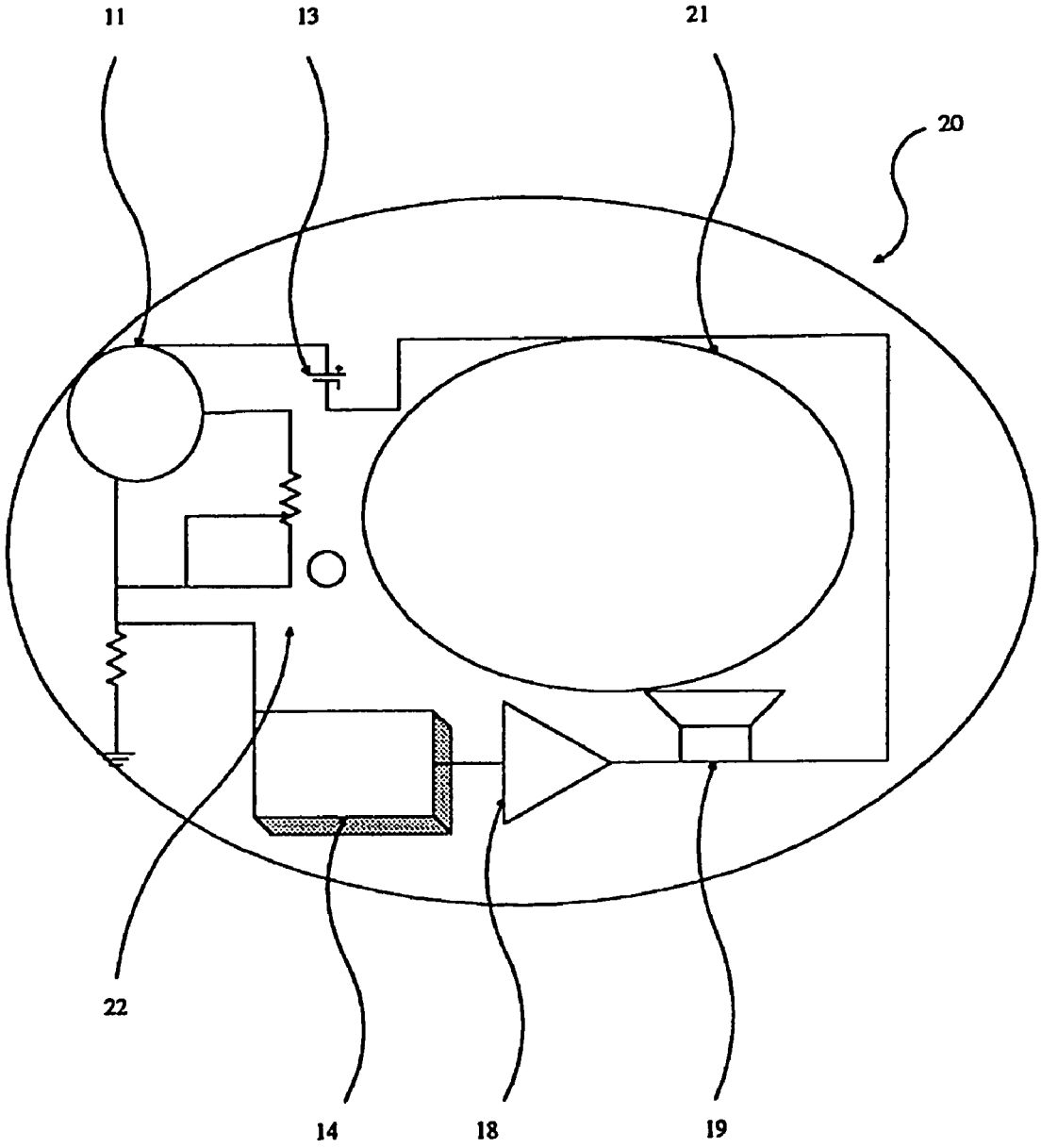
FIG. 4 is a cross-sectional view of an eggshell-type package incorporating an single type of detector in an embodiment of the present invention.

Now referring to FIG. 4, there is shown an eggshell type package 20 housing an embodiment of the present invention. Power source 13 is coupled to transducer 11. Transducer 11 is connected to speech microprocessor 14. Output of transducer 11 is regulated by regulating means 22 such that the threshold of response necessary to activate speech microprocessor 14 can be set. Speech microprocessor 14 is further connected to amplifier 18 and through such to speaker 19. Speaker 19 is located in proximity to egg shell opening 21 such that when speech microprocessor 14 is activated, the linguistic string appears to be coming from within egg shell-type package 20.

Figure 5:
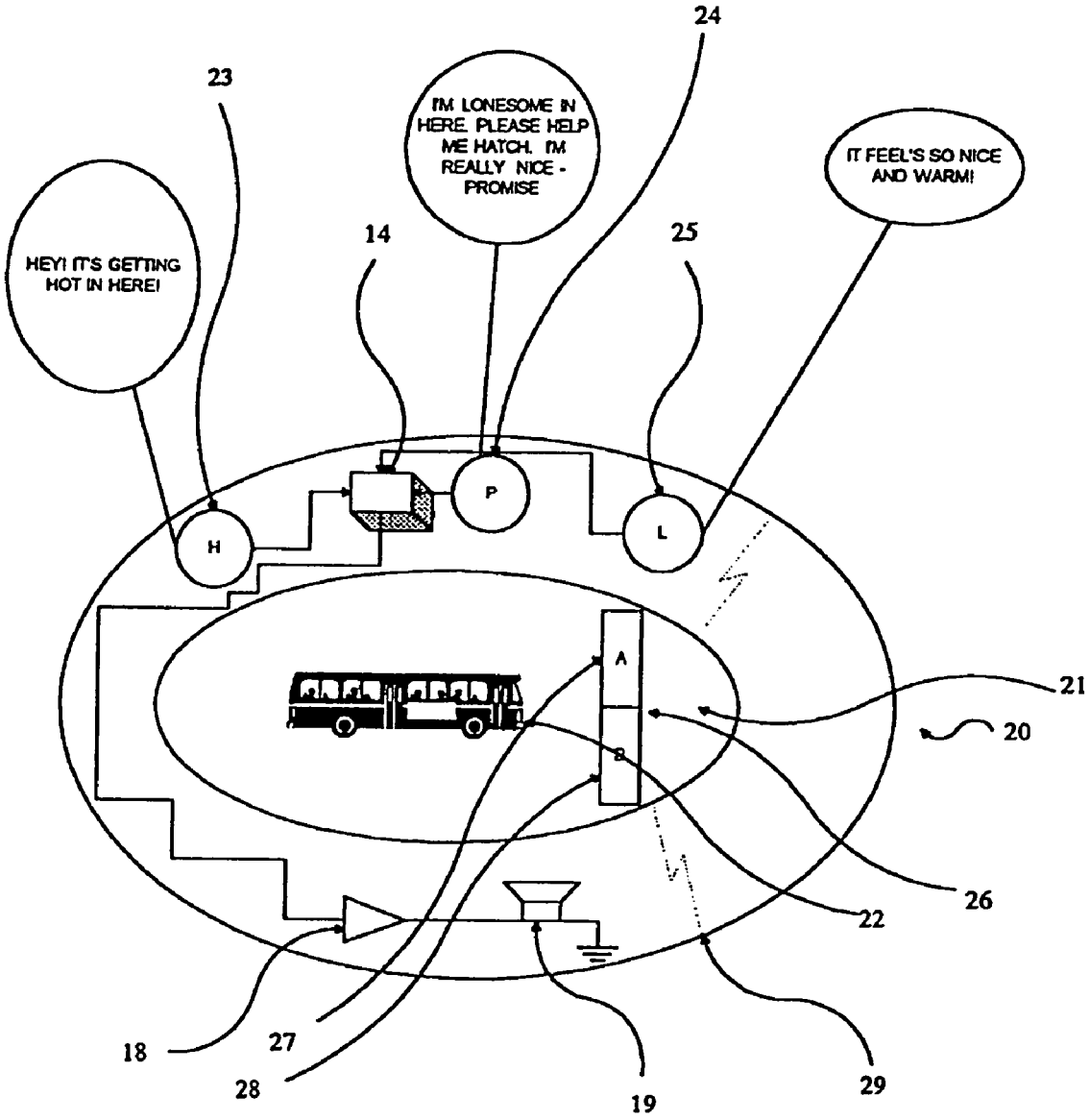
FIG. 5 is a cross-sectional view of an egg shell-type package incorporating multiple types of detectors in an embodiment of the present invention.

Referring to FIG. 5 of the drawings, there is shown a cross-sectional view of egg shell-type package 20 incorporating multiple types of detectors—high temperature detector 23, intermediate temperature detector 25 and pressure detector 24. Egg shell-type package 20 houses gift 22, in this case a toy bus, in egg shell opening 21. Activation of any of detectors 23-25 causes a special lingusitic response to effectuated by means of one or more speech microprocessors 14. Speech microprocessor(s) 14 are connected to amplifier 18 and speaker 19 in such a manner that the lingusitic sound produced appears to be emanating from within egg shell opening 26. Gas egg opening means 26 consists of acid component 27 separated from base component 28 by means of a thin heat-labile plastic. Acid component 27 may be acetic acid and base component 28 sodium bicarbonate. Egg opening may also be performed by disintegration of heat-labile material 29 placed at certain points along egg shell-type package 20. As shown, such egg opening points are preferrably at points in which none of the electronic circuitry resides. Several possible linguistic strings are shown in the figure, although as will be appreciated, many other strings may be used (e.g., "Please let me out I won't hurt you!").

What is claimed is:

1. A package amusement device comprising:

a packaging means for packaging a gift, said packaging means selected from the group *consisting* of *at least one of*: a *gift* box, [an enclosing shell], *an egg-shell,* a *gift* bag, wrapping paper, *and* ribbon material;

a detection means integrated with said packaging means for detecting change with repect to the packaging means or to the immediate vicinity of said packaging means;

a microprocessor means integrated with said packaging means and electronically connected to said detection means for generating a pre-programmed signal upon said change with respect to the packaging means or to the immediate vicinity of said packaging means;

a sense-detectible signal generating means electronically connected to said microprocessor means for generating a sense-detectible signal in response to said pre-programmed signal from said microprocessor means.

2. The package amusement device of claim 1 wherein said sense-detectable signal is sound.

3. The package amusement device of claim 1 wherein said sense-detectable signal is light.

4. An egg-shell shaped package amusement device, comprising:

an egg-shell shaped housing;

a gift disposed within said egg-shell shaped housing;

a detection means integrated with said egg-shell shaped housing for detecting change with repect to said egg-shell shaped housing or to the immediate vicinity of said egg-shell shaped housing;

a microprocessor means integrated with said egg-shell shaped housing and electronically-coupled to said detection means for generating a pre-programmed signal upon said change with respect to said egg-shell shaped housing or to the immediate vicinity of said egg-shell shaped housing;

a sense-detectible signal generating means electronically coupled to said microprocessor means for generating a sense-detectible signal in response to said pre-programmed signal from said microprocessor means.

5. The egg-shell shaped amusement device of claim 4 wherein said detection means is a plurality of heat-sensitive detectors.

6. The egg-shell shaped amusement device of claim 5 wherein said plurality of heat-sensitive detectors are set to respond at different temperatures.

7. The egg-shell shaped amusement device of claim 4 wherein said gift is a toy dinosaur.

8. The egg-shell shaped amusement device of claim 4 wherein said gift is a toy chicks.

9. The egg-shell shaped amusement device of claim 4 wherein said gift is a toy bunny.

10. The egg-shell shaped amusement device of claim 4 wherein said gift is attached to a spring.

11. The egg-shell shaped amusement device of claim 4 further comprising a heat-labile gas-generating means housed within said egg-shell housing.

12. The egg-shell shaped amusement device of claim 11 wherein said heat-labile gas-generating means comprises acetic acid and sodium bicarbonate.

13. The heat-labile gas-generating means of claim 12 wherein said acetic acid and sodium bicarbonate are separated from each other by a heat-labile membrane.

14. The egg-shell shaped amusement device of claim 4 further comprising a heat labile material within said egg-shell housing.

*15. A package amusement device comprising:*

*a package selected from the group consisting of at least one of; an egg-shell, a gift bag, gift box, wrapping paper, and ribbon material;*

*a detector integrated with said package, operatively configured to detect change with respect to said package or to the immediate vicinity of said package;*

*a microprocessor integrated with said package, and electronically connected to said detector, operatively configured to generate a signal upon said change with respect to the package or to the immediate vicinity of the package; and*

*a signal generator electronically connected to said microprocessor operatively configured to generate a sense-detectable signal in response to said signal from said microprocessor.*

*16. The package amusement device of claim 15 wherein the sense-detectable signal is selected from the group consisting of: sound, light, motion, smell.*

*17. An egg-shell shaped package amusement device, comprising:*

*an egg-shell shaped housing;*

*a gift disposed within said egg-shell shaped housing;*

*a detector associated with said egg-shell shaped housing operatively configured to detect change with respect to said egg-shell shaped housing or to the immediate vicinity of said egg-shell shaped housing;*

*a microprocessor associated with said egg-shell shaped housing, and electronically coupled to said detector, operatively configured to generate a signal upon said change with respect to said egg-shell shaped housing or to the immediate vicinity of said egg-shell shaped housing; and*

*a signal generator, electronically coupled to said microprocessor, operative configure to generate a sense-detectable signal in response to said signal from said microprocessor.*

*18. The egg-shell shaped amusement device of claim 17 wherein said detector is a plurality of heat-sensitive detectors.*

*19. The egg-shell shaped amusement device of claim 18 wherein said plurality of heat-sensitive detectors are set to respond to different temperatures.*

*20. The egg-shell shaped amusement device of claim 17 wherein said gift is attached to a spring.*

*21. A package amusement device comprising:*

*a package comprising a gift packaging box fabricated from packaging material configured for incorporating objects and/or gifts therein;*

*a detector integrated with said package, operatively configured to detect change with respect to said package or to the immediate vicinity of said package;*

*a microprocessor integrated with said package, and electronically connected to said detector, operatively configured to generate a signal upon said change with respect to the package or to the immediate vicinity of the package; and*

*a signal generator, integrated within the packaging material comprising said package, electronically connected to said microprocessor operatively configured to generate a sense-detectible signal in response to said signal from said microprocessor.*

*22. A package amusement device comprising:*

*a packaging means selected from the group consisting of at least one of: an egg-shell, a gift box, a gift bag, wrapping paper, and ribbon material, said packaging means comprising packaging for incorporating objects and/or gifts therein;*

*a detection means integrated with said packaging means configured for detecting change with respect to the packaging means or to the immediate vicinity of said packaging means;*

*a microprocessor integrated with said packaging means, and electronically connected to said detection means operatively configured for generating a pre-programmed signal upon said change with respect to the packaging means or to the immediate vicinity of the packaging means;*

*a sense-detectible signal generating means electronically connected to said microprocessor means operatively configured for generating a sense-detectible signal in response to said pre-programmed signal from said microprocessor means,*

*wherein said detection means is a detector that detects motion.*

* * * * *